M. J. WHEELER.
COMBINED HEATER AND RADIATOR.
APPLICATION FILED MAR. 10, 1910. RENEWED NOV. 7, 1911.

1,023,450.

Patented Apr. 16, 1912.

WITNESSES:
J. L. Bowling
L. E. Noack

INVENTOR
Mary J. Wheeler,
BY Schley & Davis
ATTORNEYS

UNITED STATES PATENT OFFICE.

MARY J. WHEELER, OF DALLAS, TEXAS.

COMBINED HEATER AND RADIATOR.

1,023,450. Specification of Letters Patent. Patented Apr. 16, 1912.

Application filed March 10, 1910, Serial No. 548,341. Renewed November 7, 1911. Serial No. 659,056.

*To all whom it may concern:*

Be it known that I, MARY J. WHEELER, citizen of the United States, residing at Dallas, in the county of Dallas and State of Texas, have invented certain new and useful Improvements in Combined Heaters and Radiators, of which the following is a specification.

This invention has relation to heaters and particularly a combined water heater and radiator.

The object of the invention is to provide a heater having a water tank supported therein with a burner coil surrounding the tank and a base burner disposed beneath the tank in combination with means for supporting fuel to the burners and means for supplying water to, and delivering it from the tank, whereby water is expeditiously heated and heat radiated from the heater.

Finally the object of the invention is to provide means of the character described that will be strong, durable, efficient, and easy of operation, simple and comparatively inexpensive to construct, and also in which the several parts will not be likely to get out of working order.

Figure 1:
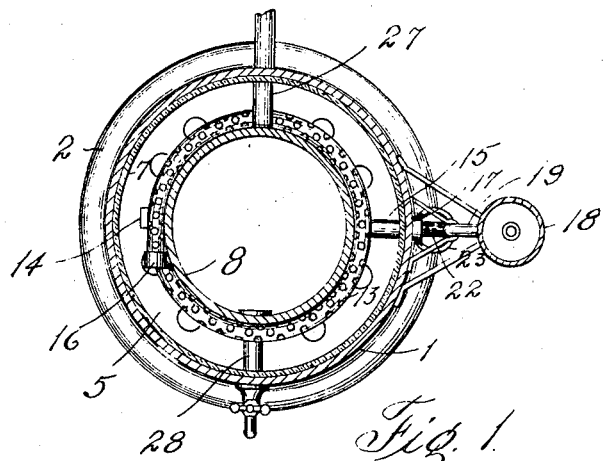
Figures 2, 3:
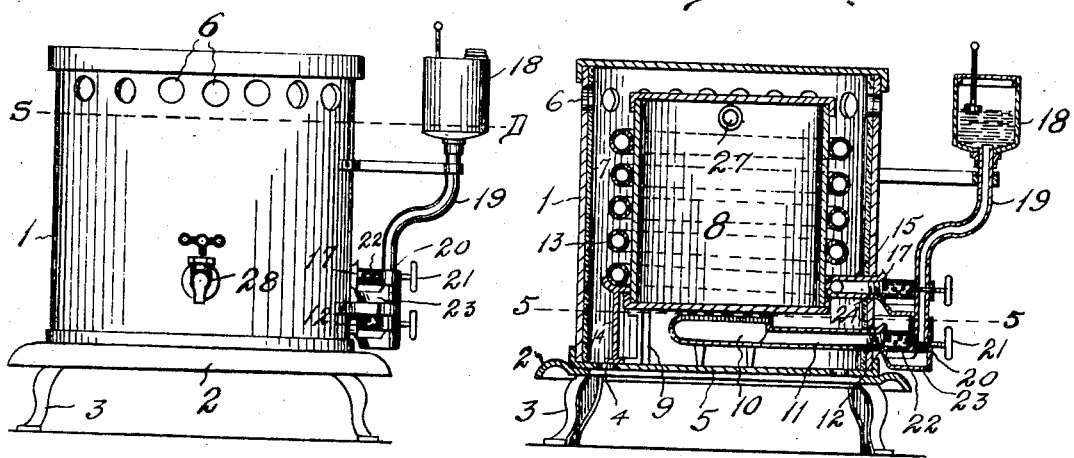
Figure 5:
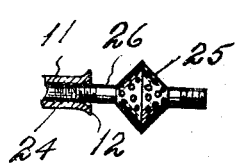
Figure 4:
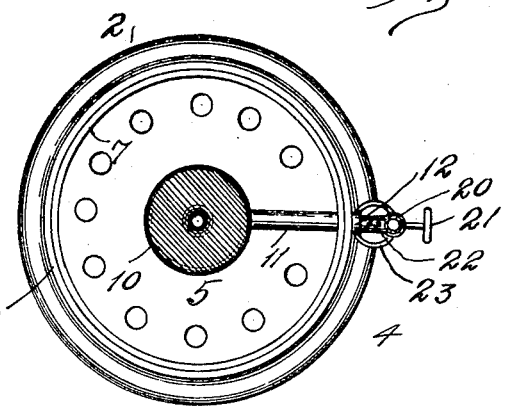

With the above and other objects in view, the invention has relation to certain novel features of construction and operation, an example of which is described in this specification and illustrated in the accompanying drawings, wherein:

Figure 1, is a horizontal sectional view taken on the line S—D of Fig. 2, Fig. 2, is an elevation, Fig. 3, is a vertical section, Fig. 4, is a horizontal sectional view on the line 5—5 of Fig. 3, and Fig. 5, is a detail of a modified form of burner connection.

In the drawings the numeral 1 designates a cylindrical casing suitably supported on a base member 2 having legs 3. The casing has draft openings 4 in its bottom 5 and openings 6 near its closed top, through which heat escapes. The casing has a lining 7 of asbestos or other suitable material disposed in contact with its side walls which acts to deflect the heat products against a central tank 8 and also to cause the heat products to be more efficiently thrown out through the openings 6.

The tank 8 is made of thin metal as copper or other suitable material and has a diameter considerably smaller than the internal diameter of the casing whereby an annular space is provided therebetween. A suitable space is provided under the tank by supporting the same on brackets 9 resting on the bottom 5 and the tank is terminated a short distance below the top of the casing, the heat products thus having a free and unobstructed path on all sides of the tank.

Beneath the tank a flat burner 10 is supported on the bottom 5 and is provided with a horizontal gas supply tube 11 extending through the side of the casing and terminating in a flaring mouth 12. A burner 13 in the form of a perforated pipe coiled about the tank, is supported upon a stand 14 and provided with a gas supply tube 15 extending through the side of the casing directly over the tube 11. The upper end of the burner 13 is closed by a cap 16 or other suitable means. The tube 15 also has a flaring mouth 17.

For supplying gas to the tubes of the burners, a gasolene reservoir 18 is supported on the upper end of a supply pipe 19 which has connection at its lower end with a valve casing 20. These parts are located outside of the casing and the valve casing is provided with a suitable valve or cut-off 21.

From the valve casing a perforated mixing sleeve 22 extends horizontally and terminates at the mouth 12 of the tube 11. Beneath the sleeve a heating pan 23 is supported. This construction operates on the well known principle of vaporizing or mixing air and gasolene to form a combustible gas after the parts have been heated by burning a small quantity of gasolene in the pan. The same arrangement is duplicated for the tube 15 and a detailed description is not deemed necessary.

It will be noted that the mouth portion of each tube is internally screw threaded at 24. In Fig. 5 a gas mixer 25 is shown. This mixer is adapted to be connected with the service pipe supplying manufactured gas. When it is desired not to use gasolene, the gasolene equipment may be removed and the mixers 25 substituted. Each mixer has a screw threaded sleeve as 26 which may be screwed into the portion 24 and the connection made.

Water may be supplied to the tank 8 and delivered therefrom in various ways. In the drawings I have shown a supply pipe 27 passed through the casing and entering the tank at the upper end; while a delivery pipe 28 extends from the lower end of the tank through the casing. By this arrangement hot water may be had at all times during operation of the heater.

It is obvious that the two burners will expeditiously heat the water in the tank. Water being supplied at the upper end of the tank and the coiled burner surrounding the tank, it is apparent that the water is substantially "instantaneously heated."

What I claim is:

1. In a heater, a casing having openings near its upper end, a tank supported in the casing free of contact therewith and having provision for receiving and delivering water, a burner disposed between the tank and the casing and under the former, a second burner coiled about the tank within the casing, and means for conducting gas from the outside of the casing to the burners.

2. In a heater, a casing having openings near its upper end, a lining fitting the inside walls of the casing, a tank supported in the casing free of contact therewith and having provision for receiving and delivering water, a flat burner disposed between the tank and the bottom of the casing, a second burner in the form of a pipe coiled about the tank within the casing, fuel supply tubes leading from the burners and terminating outside the tank, and gas supplying means outside the tank in line with the outer ends of the tubes.

3. In a heater, a cylindrical casing having heat ejecting openings near its upper end, a base provided with legs and supporting the casing, a lining of fire resisting material fitting the inner side walls of the casing, a cylindrical tank of thin metal supported in the casing in concentric relation thereto, whereby an annular space is provided between the tank and the casing, means for supplying water to the tank, means for delivering water from the tank, a flat burner supported on the bottom of the casing under the tank, a tube extending from the burner through the side of the casing and terminating in a flaring mouth, a perforated burner pipe coiled upward around the tank in the annular space, a tube leading from the lower end of the pipe burner through the side of the casing and terminating in a flaring mouth, a stand in the casing supporting the burner pipe, and means for supplying gas to the flaring ends of the tubes.

In testimony whereof I have signed my name to this specification in the presence of two subscribing witnesses.

MARY J. WHEELER.

Witnesses:
 JACK A. SCHLEY,
 L. E. NOACK.